Feb. 13, 1951  A. G. SHERMAN  2,541,942
OVEN DOOR CONSTRUCTION FOR COOKING STOVES
Original Filed Aug. 11, 1947
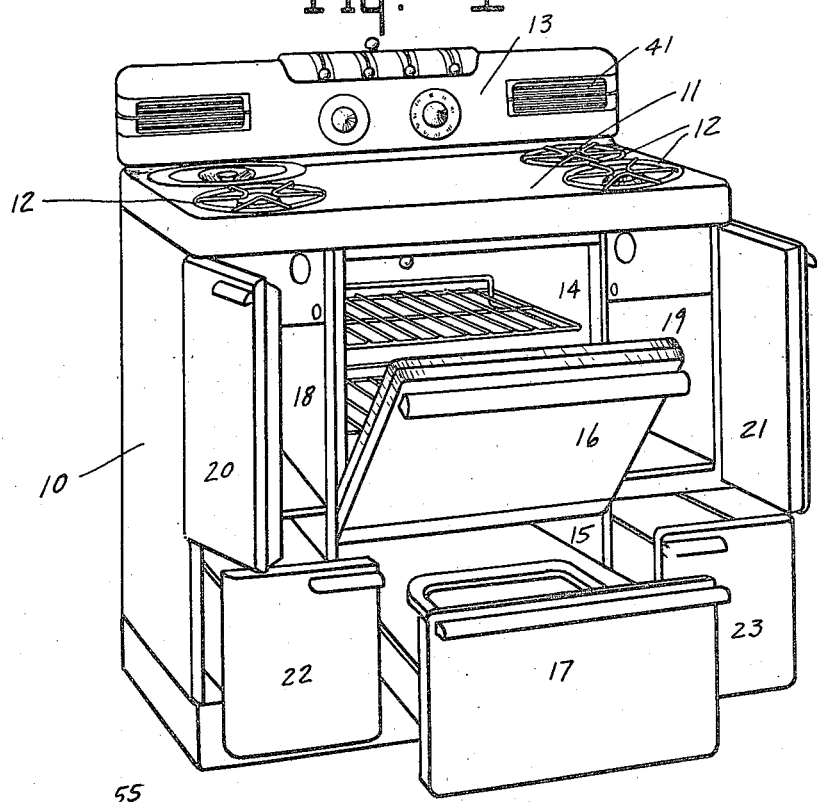
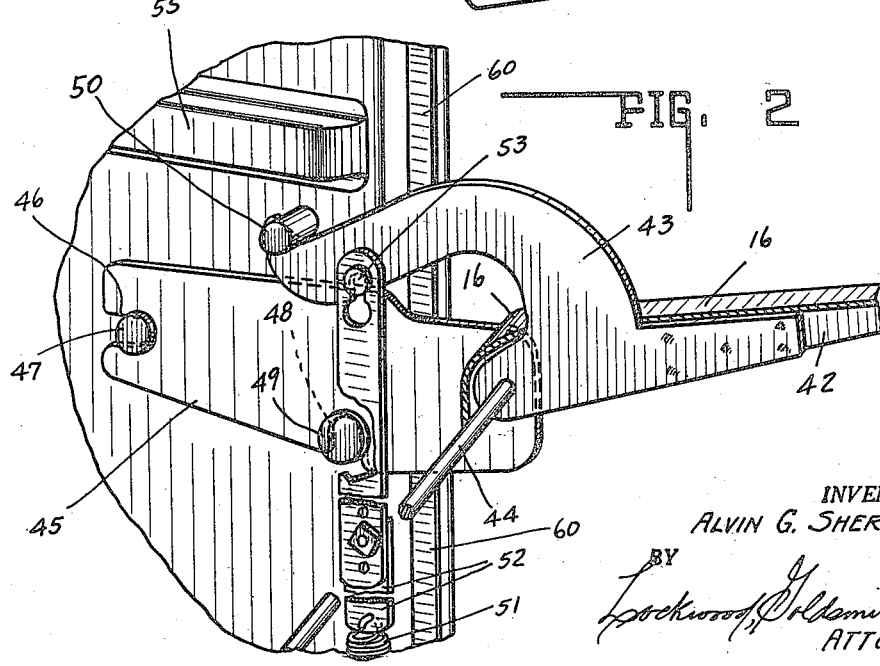
INVENTOR.
ALVIN G. SHERMAN.
BY
Lockwood, Galdsmith & Galt.
ATTORNEYS.

Patented Feb. 13, 1951

2,541,942

UNITED STATES PATENT OFFICE 2,541,942

OVEN DOOR CONSTRUCTION FOR COOKING STOVES

Alvin G. Sherman, Grosse Pointe Park, Mich., assignor to Globe American Corporation, Kokomo, Ind., a corporation Original application August 11, 1947, Serial No. 767,971. Divided and this application July 30, 1948, Serial No. 41,529

5 Claims. (Cl. 126—194)

1

This invention relates to an oven door construction for a cooking stove or range, and particularly to the detachable hinge mounting therefor, being a division of my application for Letters Patent, Serial No. 767,971, filed August 11, 1947 for Cooking Stove, now abandoned.

The object of the invention is to provide a hinge mounting for an oven door such as to permit convenient removal and replacement of the door as well as a limited movement to open position. Thus, without tools, removal of screws or bolts, the oven door with its hinge mounting may be removed by swinging it slightly upwardly from its lowered position and raising and pulling it away from the stove, having first disconnected the counterbalance tension spring therefrom.

The full nature of the invention will be understood from the accompanying drawings and the following description and claims:

Fig. 1 is a perspective view of the stove, showing its several compartments partially open.

Fig. 2 is a perspective view of the oven door hinge construction.

In the drawings there is shown a gas range having side walls 10, a cooking top 11 with the cooking well and top burners 12 mounted thereon, and an upwardly extending backguard 13 mounted at the back of the cooking top. The cooking top is supported by a central supporting unit including the oven compartment 14 and broiler compartment 15. The oven compartment is closed by the usual oven door 16 and the broiler compartment by the broiler door 17. The central supporting unit is adapted to support at opposite sides thereof the warming and storage spaces 18 and 19 having vertically hinged doors 20 and 21, respectively. Below said spaces there are provided the sliding drawers 22 and 23 for cooking utensils.

The oven door 16 is formed of spaced sheet metal panels between which suitable insulating material is packed, the inner panel thereof having secured thereto along each side tapered angle bars 42, the lower ends of which are rigidly secured by spot welding or the like to the supporting hooks 43. A hinge rod 44 extends through the forwardly and downwardly extending ears intermediate the ends of the supporting hooks 43 and into outwardly extending end portions of the hinge members 45 to pivotally

2 support said door and hooks thereon. The opposite or inner ends of each of the hinge members is bifurcated at 46 to engage and be slidably interlocked with a stud 47 extending inwardly from each of the oven walls, respectively. The lower edge of each of said hinge members is provided with a locking recess 48 adapted to seat and be removably interlocked with a stud 49 also extending inwardly from each of the oven walls, respectively. Each of the supporting hooks 43 is crooked at its inner exposed end to engage the respective inwardly extending studs 50 when the oven door is hingedly mounted and opened to its substantially horizontal lowered position.

This arrangement of the hinge mounting for the oven door facilitates removal thereof in that by swinging it slightly upwardly from its lowered position to disengage the hooks 43 from their studs 50, and then raising the inner edge of the door to disengage the hinge member from the stud 49, the door may be pulled directly outwardly to dismounted position. However, when it is in mounted position, the bifurcated ends of the hinge members are interlocked with the studs 47 and their locking recesses with studs 49, thereby preventing any disconnecting outward movement. The door is then free to swing about the hinge rod 44 to opened or closed position, and when lowered to opened position, substantially horizontally, the hooked ends of the hooks 43 engage with the studs 50 to support the door in such lowered position through the angle bars 42.

The oven door is counterbalanced when moved to and from open position by a counterbalance tension spring 51. The upper end of said spring is connected to an adjustable strap 52 which in turn is removably connected with a pin 53 on the hinge member 43. The lower end of the spring is connected with the wall of the oven substantially below the hinge mounting of the door.

The invention claimed is:

1. In a cooking stove having an oven compartment, said compartment having side walls and an oven door, the combination therewith of a series of inwardly extending studs mounted on the lower portion of each of said walls, a hinge member pivotally connected at one end thereof to each side of the lower edge of said door, each of said hinge members having its other end bifurcated for removable engagement with one of said studs respectively and the lower edge of each of said hinge members being notched to interlock with another of said studs, whereby said hinge members may slide into interlocking engagement with said studs and be withdrawn therefrom upon lifting said notches from interlocking engagement therewith, and means interconnecting said door and walls for limiting the movement of the door to open position when said hinge members are in interlocking position.

2. In a cooking stove having an oven compartment, said compartment having side walls and an oven door, the combination therewith of a series of inwardly extending studs mounted on the lower portion of each of said walls, a hinge member pivotally connected at one end to each side of the lower edge of said door, each of said hinge members having its other end bifurcated for removable engagement with one of said studs respectively and the lower edge of each of said hinge members being notched to interlock with another of said studs, whereby said hinge members may slide into interlocking engagement with said studs and be withdrawn therefrom upon lifting said notches from interlocking engagement therewith, and a supporting hook rigidly secured to each side of said door engageable with one of said studs to support and limit the movement of the door to open position and movable free of said stud upon said door being closed.

3. In a cooking stove having an oven compartment, said compartment having side walls and an oven door, the combination therewith of a series of inwardly extending studs mounted on the lower portion of each of said walls, a hinge member pivotally connected at one end to each side of the lower edge of said door, each of said hinge members having its other end bifurcated for removable engagement with one of said studs respectively and the lower edge of each of said hinge members being notched to interlock with another of said studs, whereby said hinge members may slide into interlocking engagement with said studs and be withdrawn therefrom upon lifting said notches from interlocking engagement therewith, a supporting hook rigidly secured to each side of said door engageable with one of said studs to support and limit the movement of said door to open position and movable free of said stud upon said door being closed, and yielding counterbalancing springs intermediate said hooks and oven walls for resisting the outward movement of said door when swung to lowered position.

4. In a cooking stove having an oven including side walls and an oven door hingedly mounted thereon, the combination therewith of a hinge mounting including a pair of spaced studs extending inwardly from each wall of said oven, and a hinge member pivotally connected to each side of said oven door having a bifurcated end slidable into interlocking engagement with one of said studs, each of said hinge members having a recess in the lower edge thereof for interlocking engagement with the other of said studs, whereby said door may be moved in one direction to interlock said hinge members with said studs and be removable therefrom in another direction by disengaging the notches of said hinge members from their respective studs and withdrawing the bifurcated ends laterally therefrom.

5. In a cooking stove having an oven including side walls and an oven door hingedly mounted thereon, the combination therewith of a hinge mounting including a pair of spaced studs extending inwardly from each wall of said oven, a hinge member pivotally connected to each side of said oven door having a bifurcated end slidable into interlocking engagement with one of said studs, each of said hinge members having a recess in the lower edge thereof for interlocking engagement with the other of said studs, whereby said door may be moved in one direction to interlock said hinge members with said studs and be removable therefrom in another direction by disengaging the notches of said hinge members from their respective studs and withdrawing the bifurcated ends laterally therefrom, a supporting hook rigidly connected with each side of said door movable therewith relative to said hinge members, and studs in said oven engageable by said hooks for supporting said door when in lowered open position.

ALVIN G. SHERMAN.

REFERENCES CITED

The following references are of record in the file of this patent:

UNITED STATES PATENTS

| Number | Name | Date |
| --- | --- | --- |
| 1,725,451 | Gilchrist | Aug. 20, 1929 |
| 1,798,115 | Antrim | Mar. 24, 1931 |
| 1,829,948 | Sherman | Nov. 3, 1931 |
| 1,872,020 | Taylor | Aug. 16, 1932 |
| 1,884,226 | Randolph | Oct. 25, 1932 |
| 1,922,587 | Hoffstetter et al. | Aug. 15, 1933 |
| 1,979,210 | Rogers | Oct. 30, 1934 |
| 1,989,151 | Pickup | Jan. 29, 1935 |
| 2,113,543 | Haley | Apr. 5, 1938 |
| 2,180,552 | Schroeder et al. | Nov. 21, 1939 |
| 2,208,871 | Rogers | July 23, 1940 |
| 2,253,398 | Reifenberg | Aug. 19, 1941 |
| 2,339,398 | Hennessy et al. | Jan. 18, 1944 |
| 2,425,365 | Davidson | Aug. 12, 1947 |
| 2,447,341 | Johnson | Aug. 17, 1948 |